US008379692B2

United States Patent
Wang

(10) Patent No.: US 8,379,692 B2
(45) Date of Patent: Feb. 19, 2013

(54) COHERENT COMBINING/NONCOHERENT DETECTION (CCND) METHOD AND APPARATUS FOR DETECTING A PILOT SIGNAL IN A WIRELESS COMMUNICATION SYSTEM

(75) Inventor: Xiao-an Wang, Allentown, PA (US)

(73) Assignee: Agere Systems LLC, Allentown, PA (US)

( * ) Notice: Subject to any disclaimer, the term of this patent is extended or adjusted under 35 U.S.C. 154(b) by 2519 days.

(21) Appl. No.: 10/289,699

(22) Filed: Nov. 7, 2002

(65) Prior Publication Data

US 2003/0053528 A1  Mar. 20, 2003

Related U.S. Application Data

(63) Continuation of application No. 09/188,767, filed on Nov. 9, 1998, now abandoned.

(51) Int. Cl.
*H04B 1/00* (2006.01)
(52) U.S. Cl. ........ 375/147; 370/491; 370/500; 375/325; 375/E1.032; 329/327; 329/360
(58) Field of Classification Search .................. 370/203, 370/320, 335, 342; 375/130, 140, 142, 147, 375/148, 367
See application file for complete search history.

(56) References Cited

U.S. PATENT DOCUMENTS

| 5,619,524 A | 4/1997 | Ling et al. ...................... 375/200 |
| 5,644,591 A | 7/1997 | Sutton ............................ 375/200 |
| 5,757,846 A | 5/1998 | Vasudevan ..................... 375/200 |
| 5,767,738 A * | 6/1998 | Brown et al. ................. 329/304 |
| 5,787,112 A * | 7/1998 | Murai ............................ 375/148 |
| 5,799,010 A * | 8/1998 | Lomp et al. ................... 370/335 |
| 5,805,648 A | 9/1998 | Sutton ............................ 375/367 |
| 5,930,288 A | 7/1999 | Eberhardt ...................... 375/200 |
| 5,987,076 A | 11/1999 | Zehavi et al. ................. 375/340 |
| 6,005,889 A * | 12/1999 | Chung et al. .................. 375/140 |
| 6,141,334 A | 10/2000 | Flanagan et al. .............. 370/342 |
| 6,665,308 B1 * | 12/2003 | Rakib et al. ................... 370/441 |

FOREIGN PATENT DOCUMENTS

| WO | WO 96/10879 | 4/1996 |
| WO | WO 98/18202 | 4/1998 |
| WO | WO 98/40972 | 9/1998 |

OTHER PUBLICATIONS

Viterbi, A., "CDMA Principles of Spread Spectrum Communication," Addison-Wesley Wireless Communication Series, 39-53 (1995).

* cited by examiner

*Primary Examiner* — David C. Payne
*Assistant Examiner* — Adolf Dsouza
(74) *Attorney, Agent, or Firm* — Ryan, Mason & Lewis, LLP

(57) ABSTRACT

A method and apparatus are disclosed for detecting a pilot signal in a wireless receiver using coherent combining/noncoherent detection techniques. Coherent combining/noncoherent detection techniques are used to detect the pilot signal whenever the receiver is already frequency locked, or otherwise known to have a small frequency offset Conventional noncoherent combining/noncoherent detection techniques are utilized to initially acquire the timing of the forward channel. Once the receiver is frequency locked, coherent combining/noncoherent detection techniques may be used to continuously detect the pilot signals. After the receiver is frequency locked, the residue frequency error is small over several consecutive correlator outputs The correlator outputs can thus be combined coherently (since the frequency error is known to be small), and the phase dependency is then eliminated by noncoherent detection.

12 Claims, 3 Drawing Sheets

COHERENT COMBINING/NONCOHERENT DETECTION (CCND) METHOD AND APPARATUS FOR DETECTING A PILOT SIGNAL IN A WIRELESS COMMUNICATION SYSTEM

CROSS-REFERENCE TO RELATED APPLICATIONS

This application is a continuation of U.S. patent application Ser. No. 09/188,767, filed Nov. 9, 1998, now abandoned incorporated by reference herein.

FIELD OF THE INVENTION

The present invention relates to wireless communication systems, and more particularly, to methods and apparatus for detecting a pilot signal in a wireless communication system.

BACKGROUND OF THE INVENTION

Code division multiple access (CDMA) techniques have been employed in many digital wireless communication systems to permit a large number of system users to communicate with one another. Many communication systems utilizing code division multiple access techniques comply with the IS-95 standard, adopted by the Telecommunication Industry Association (TIA). Under the IS-95 standard, a communication system substantially eliminates co-channel interference and improves the bit energy-to-noise density ratio, $E_b/N_o$, on the forward link from a base station or cell site to a mobile receiver unit by modulating the information signals with Walsh orthogonal function sequences. To produce corresponding orthogonal information signals, these CDMA systems require that the forward link information signals be transmitted in a synchronized manner. A more detailed discussion of the IS-95 standard is provided in "Mobile Station-Base Station Compatibility Standard for Dual-Mode Wideband Spread Spectrum Cellular System," Telecommunication Industry Association Doc. No. TIA/EIA/IS-95 (1993), incorporated by reference herein.

Under the IS-95 standard, the forward link generally consists of a number of administration channels, with the remaining channels being utilized for voice and data signals. One of the administration channels is a pilot channel, which is an unmodulated, direct-sequence spread spectrum signal transmitted continuously by each CDMA base station. The pilot channel is modulated by a pilot PN sequence, consisting of a pair of modified maximal length PN sequences (in-phase and quadrature) with a period of $2^{15}$ chips. Different base stations are identified by different pilot PN sequence offsets in units of 64 PN chips of a pilot, relative to the zero offset pilot PN sequence.

The pilot channel allows a mobile station to acquire the timing of the Forward CDMA Channel after a phone is initially turned on ("initial pilot detection"). During the voice and data modes, the pilot channel enhances the overall signal quality by providing a phase reference for coherent demodulation and a means for signal strength comparisons between base stations for determining when to handoff a call between two cells ("continuous pilot detection"). In addition, CDMA phones have a slotted mode for power saving, during which time the phone only operates at given slots to keep the connection alive while going into a sleep mode for the rest of the time. In order to maintain the timing of the Forward CDMA Channel each time the phone returns to an operative mode at given slots, the pilot detector must research all the signal paths before the phone wakes up at its slot ("slotted pilot detection").

The pilot detector must be able to locate new signal paths with the lowest possible false alarm probability within the shortest possible time. Such requirements, however, are mutually exclusive and trade-offs are required. The trade-offs are largely limited, however, by the complicated and time-intensive noncoherent combining/noncoherent detection (NCND) scheme that is employed in current system designs. In addition, the noncoherent combining severely degrades the detection performance. For a detailed discussion of noncoherent combining/noncoherent detection, see, for example, Andrew Viterbi, CDMA Principles of Spread Spectrum Communication (Addison Wesley 1995), incorporated by reference herein.

SUMMARY OF THE INVENTION

Generally, a method and apparatus are disclosed for detecting a pilot signal in a wireless receiver using coherent combining/noncoherent detection (CCND) techniques. According to a feature of the invention, coherent combining/noncoherent detection techniques are used to detect the pilot signal whenever the receiver is already frequency locked, or otherwise known to have a small frequency offset. Thus, conventional noncoherent combining/noncoherent detection techniques are utilized to initially acquire the timing of the forward channel. Once the receiver is frequency locked, coherent combining/noncoherent detection techniques may be used to continuously detect the pilot signals in a more efficient manner.

The present invention takes advantage of the fact that after the receiver is frequency locked, the residue frequency error is small over several consecutive correlator outputs. The correlator outputs can thus be combined coherently (since the frequency error is known to be small), and the phase dependency is then eliminated by noncoherent detection. This scheme improves the signal-to-noise ratio (SNR) by 2.5 dB over conventional noncoherent combining/noncoherent detection techniques, which translates to faster search times, more reliable detections and additional power savings.

The disclosed coherent combining/noncoherent detection technique can be extended to the case where the accumulation length, L, is too large such that coherent combining over L correlator outputs will have significant degradation even when the frequency error is small. In this case, the L outputs can be broken into M groups each of which contain $L_1$ outputs, such that $L=ML_1$. In this manner, coherent combining/noncoherent detection and noncoherent combining/noncoherent detection techniques are combined to prevent cancellation of a peak due to a rotating pilot signal.

DETAILED DESCRIPTION

Figure 1:
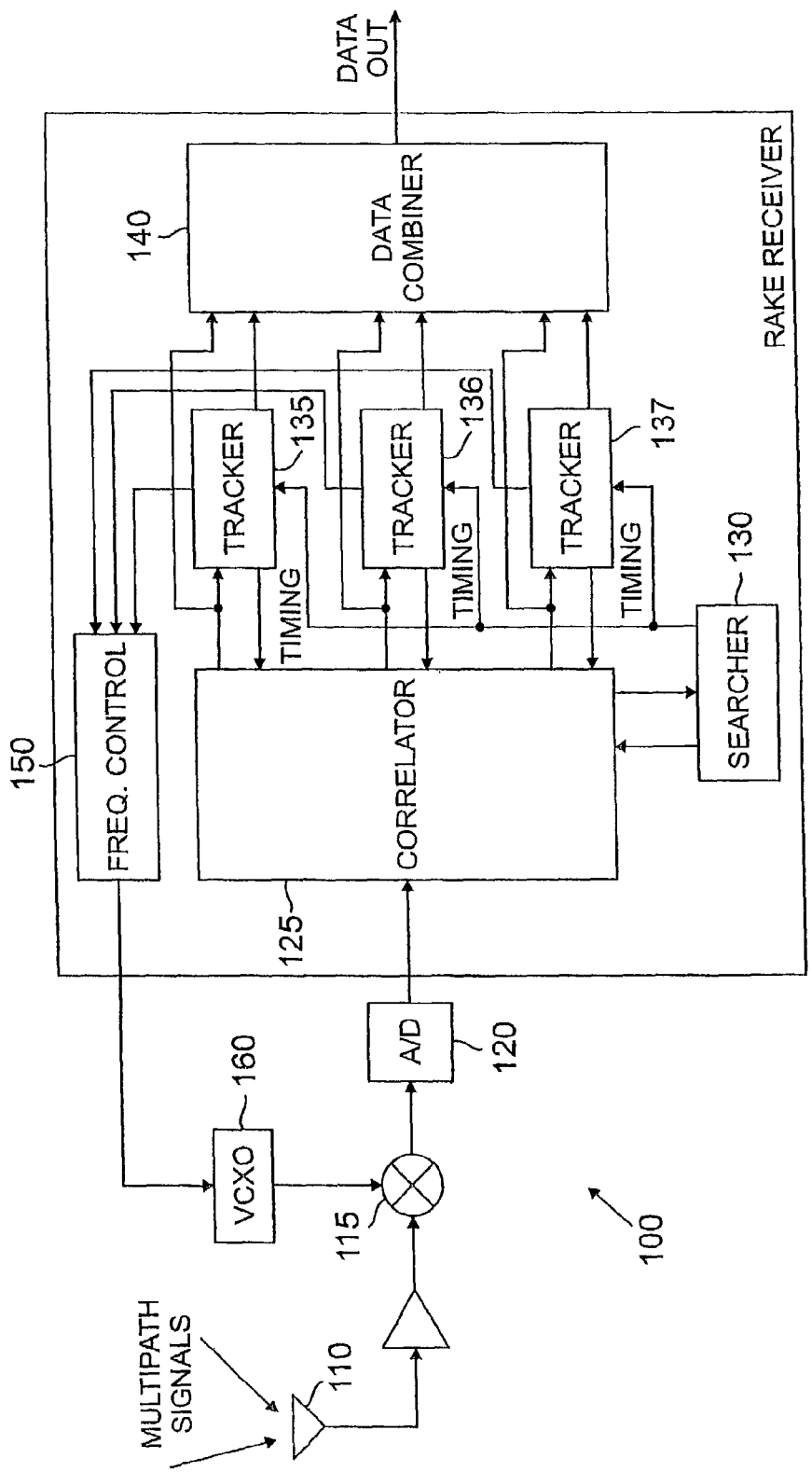
FIG. 1 is a block diagram of an illustrative conventional rake receiver in a wireless communication system.

FIG. 1 illustrates a representative receiver 100 that implements conventional noncoherent combining/noncoherent detection techniques. As shown in FIG. 1, the multi-path (and multi-channel) signals are received by an antenna 110, returned to baseband by a mixer 115 that multiplies the received signal by the carrier frequency, and sampled by an analog-to-digital converter 120.

It is noted that when the receiver 100 initially searches for the pilot channel, the frequency and phase of the incoming signal are unknown. When the incoming signal becomes aligned with the PN sequence inputs to the correlator 125, there will be a peak at the output of the correlator 125. The searcher 130 monitors the output of the correlator 125 for such peaks. The operation of the correlator 125 and searcher 130 are discussed further below.

Once a peak is detected by the searcher 130, the searcher 130 outputs the time location of the multipath to the trackers 135-137. Each tracker 135-137 monitors a different multipath signal (for example, a signal associated with a potential alternate base station). The output of the trackers 135-137 are provided to a data combiner 140, that looks at the tracker output to combine all multipath signals and maximize the signal-to-noise ratio for the data. In addition, the output of the trackers 135-137 are provided to a frequency controller 150 that provides a feedback loop to match the frequency of the local oscillator (VCXO) 160 to the frequency of the incoming data signal.

The phase and frequency misalignment between the oscillators of the base station (not shown) and the receiver 100, causes the output of the correlator 125, when a signal is present, to be expressed as:

$$x_n + jy_n = he^{j(\theta + n\omega T)} + V_n \quad \text{Eq. (1)}$$

where $x_n$ and $y_n$ are the real and imaginary part of the output of the correlator 125, respectively, h is the pilot amplitude, $\theta$ is the arbitrary initial phase, $\omega$ is the frequency offset, T is the sample time of the correlator output, and $v_n$ is the complex Gaussian noise.

Without the phase, however, identifying the correlator output peak is not straightforward. The well known noncoherent combining/noncoherent detection scheme eliminates the phase and frequency dependency by forming the decision variable, D, as follows:

$$D = \sum_{n=1}^{L} (x_n^2 + y_n^2) \quad \text{Eq. (2)}$$

Thus, noncoherent combining/noncoherent detection techniques look at the square of the amplitude of the real and imaginary portions of the correlator output, $x_n^2 + y_n^2$, until a peak is observed, indicating alignment.

Unfortunately, however, when noncoherent combining/noncoherent detection techniques square the amplitude of the real and imaginary portions of the correlator output, $x_n^2 + y_n^2$, the noise is enhanced as well. Thus, noncoherent combining/noncoherent detection techniques degrade the signal-to-noise ratio by at least a factor of 2, or 6 dB.

Under the IS-95 standard, each user is treated as a separate signal, while the other users are treated as either interference or noise. Thus, the signal-to-noise ratio is low. In the presence of a low signal-to-noise ratio, it is insufficient to detect the pilot signal using 64-chip correlation. In order to do more correlation, the correlator 125 must reload with the next 64 chip sequence L times to increase the correlation length. Thus, equation (2) performs the combining over L correlator outputs to increase the detection performance. The detector decides whether a signal path is present based on the value of D. Equation (2) shows that the combining and the detection are noncoherent.

The noncoherent combining/noncoherent detection techniques described above are necessary in the presence of large frequency errors when the base station and mobile receiver 100 are not aligned. During the initial pilot search, for example, the frequency error resulting from the unaligned condition can be several kilohertz. A long correlation cannot be utilized in the presence of large frequency errors, because during correlation, the pilot signal keeps rotating and the peak amplitude cannot be detected even if aligned. Thus, 64-chip correlation is utilized. In other words, the direction of the pilot signal keeps changing, and effectively cancels itself. As previously indicated, the noncoherent combining severely degrades the detection performance.

According to a feature of the present invention, a coherent combining/noncoherent detection technique is disclosed that takes advantage of the fact that after the mobile receiver 100 is frequency locked, the residue frequency error is small over several consecutive correlator outputs. The correlator outputs can thus be combined coherently (since the frequency error is known to be small), and the phase dependency is then eliminated by noncoherent detection. This scheme improves the signal-to-noise ratio by 2.5 dB over conventional noncoherent combining/noncoherent detection techniques, which translates to faster search times, more reliable detections and additional power savings. In the presence of small frequency errors, the pilot signal will not rotate for a complete cycle (on the order of a 10-degree rotation). Thus, if the incoming pilot signal is aligned with the PN sequence input to the correlator, during 64-chip correlation, the peak amplitude will be apparent and the cancellation effect found with noncoherent combining techniques is not present.

Coherent Combining/Noncoherent Detection

Figure 2:
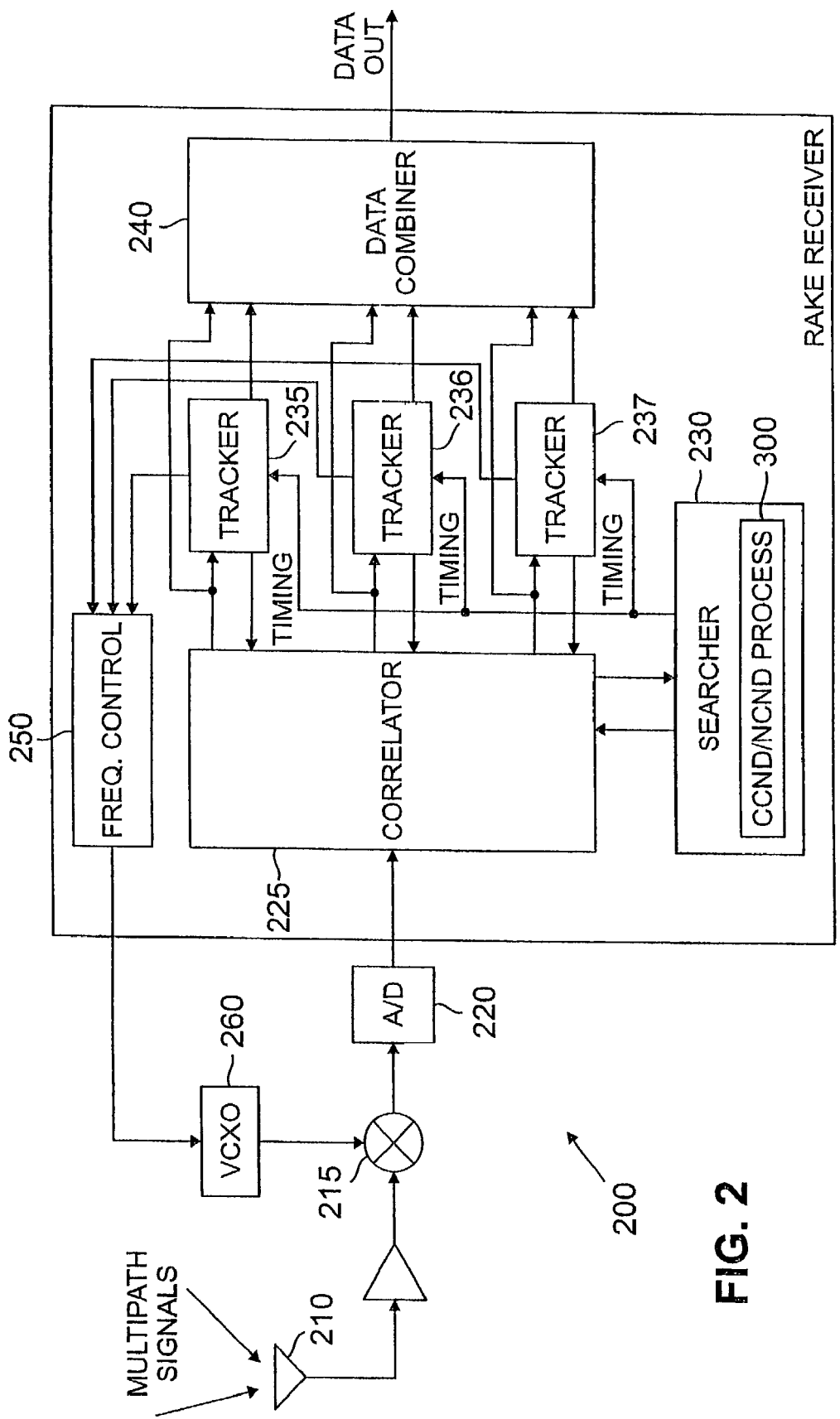
FIG. 2 is a schematic block diagram of an illustrative rake receiver in accordance with the present invention.

FIG. 2 illustrates a representative receiver 200 that implements coherent combining/noncoherent detection techniques in accordance with the present invention. The components of the receiver 200 may be identical to those described above in conjunction with FIG. 1, except for the searcher 230. After the receiver 200 is frequency locked, the residue frequency error is kept within 300 Hz to conform to the IS-95 Specification. The rate of the output of the correlator 225 is 19.2 kHz, or a period, T, of 52.08 μseconds. Thus, the frequency error is small compared to the correlator output rate. Accordingly, within the time frame of several samples (L=8), for example, the frequency term in Equation (1) can be dropped and a coherent combining can be performed as follows:

$$\sum_{n=1}^{L}(x_n + jy_n) \approx Lhe^{j\theta} + \sum_{n=1}^{L} v_n \quad \text{Eq. (3)}$$

The dependency of the results of the combination performed in accordance with Equation (3) on the initial phase error, $\theta$, can be eliminated by forming a decision variable, $D_1$, for noncoherent detection:

$$D_1 = \left|\sum_{n=1}^{L}(x_n + jy_n)\right|^2 \quad \text{Eq. (4)}$$

The detector then decides whether a signal path is present based on the value of $D_1$. Thus, while the conventional noncoherent combining/noncoherent detection techniques may be utilized for pilot detection during the initial, continuous and slotted modes, described above, the present invention provides significant performance improvements by implementing a coherent combining/noncoherent detection technique whenever the frequency is already locked and the frequency offset is known to be relatively small, i.e., for the continuous and slotted pilot detection modes.

Figure 3:
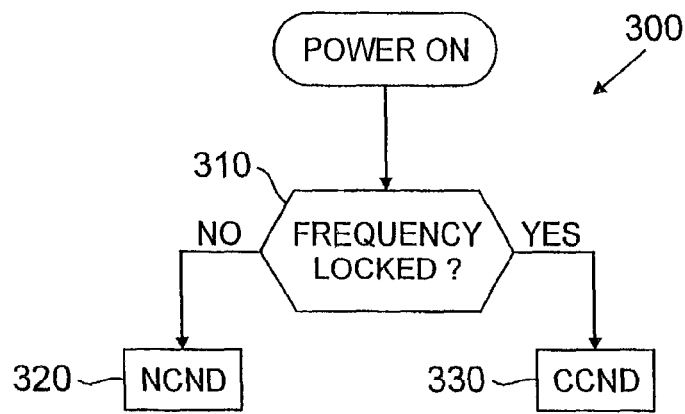
FIG. 3 is a flow chart illustrating an exemplary CCND/NCND process as performed by the searcher of FIG. 2.

As shown in FIG. 2, the searcher 230 includes a coherent combining/noncoherent detection process 300, shown in FIG. 3. The coherent combining/noncoherent detection process 300 may be implemented in hardware, software or a hybrid of the foregoing. The coherent combining/noncoherent detection process 300 is initiated when the mobile receiver 200 is powered on, and initially performs a test during step 310 to determine if the receiver is frequency locked. If it is determined during step 310 that the receiver is not yet frequency locked, a noncoherent combining/noncoherent detection technique will be performed by the searcher 230 during step 320, and program control will return to step 310 and continue processing in the manner described above.

In this manner, the coherent combining/noncoherent detection process 300 will continue to utilize a noncoherent combining/noncoherent detection technique until it is determined during step 310 that the receiver 200 is frequency locked, upon which the searcher 230 will implement a coherent combining/noncoherent detection technique during step 330.

The coherent combining/noncoherent detection technique disclosed herein can be extended to the case where the accumulation length, L, is too large such that coherent combining over L correlator outputs will have significant degradation even when the frequency error is small. In this case, the L outputs can be broken into M groups each of which contain $L_1$ outputs, such that $L=ML_1$. Thus, the decision variable, $D_2$, can be expressed as:

$$D_2 = \sum_{k=1}^{M} \left| \sum_{n=(k-1)L_1+1}^{kL_1} (x_n + jy_n) \right|^2 \quad \text{Eq. (5)}$$

Thus, Equation (5) combines both coherent combining/noncoherent detection and noncoherent combining/noncoherent detection techniques. If, for example, the pilot signal would rotate and cancel over L=16 accumulations, then the first 8 correlator outputs can be coherently combined, and the next 8 correlator outputs can be coherently combined, with the resulting two sets being noncoherently combined.

Figure 4:
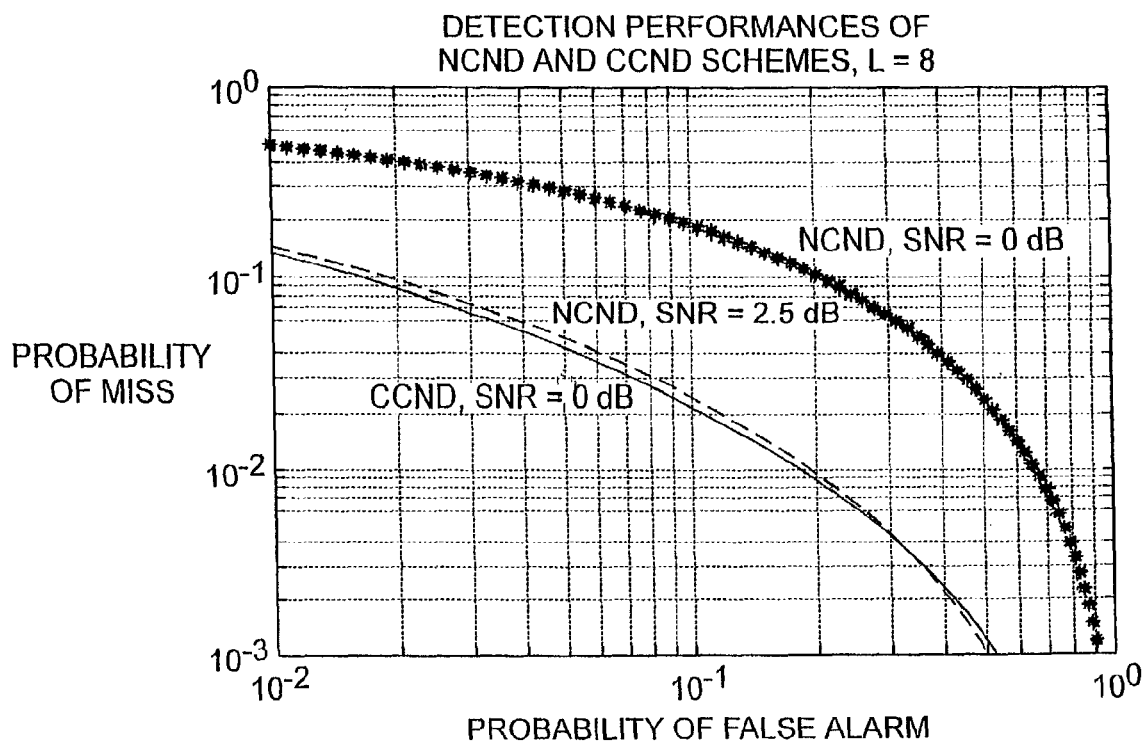
FIG. 4 illustrates the performance curves of the coherent combining/noncoherent detection and noncoherent combining/noncoherent detection schemes over L=8 accumulations.

FIG. 4 illustrates the performance curves of the coherent combining/noncoherent detection and noncoherent combining/noncoherent detection schemes over L=8 accumulations. Typical signal-to-noise ratio values of the correlator output is −1~4 dB. The following can be observed from FIG. 4: (i) coherent combining/noncoherent detection has superior performance than noncoherent combining/noncoherent detection in that at a given signal-to-noise ratio, coherent combining/noncoherent detection has both lower false alarm probability and lower miss probability, and (ii) noncoherent combining/noncoherent detection has about the same performance at 2.5 dB as that of the coherent combining/noncoherent detection at the 0 dB. Thus, coherent combining/noncoherent detection has 2.5 dB performance gain over NCND with L=8, a typical accumulation length.

A lower false alarm probability reduces the signal processing overhead due to the response of the system to phony detections. Lower miss probability reduces the time it takes to search for a new pilot signal. Lower error probabilities also allow the system to more reliably detect the pilots and to find even weaker pilots. The overall result is increased detection performance, system responsiveness and power savings.

It is to be understood that the embodiments and variations shown and described herein are merely illustrative of the principles of this invention and that various modifications may be implemented by those skilled in the art without departing from the scope and spirit of the invention.

I claim:

1. A method for detecting a pilot signal in a wireless receiver, said method comprising the steps of:
    detecting said pilot signal using a noncoherent combining technique and a noncoherent detection technique when a frequency offset is above a predefined threshold;
    reducing said frequency offset between said receiver and an incoming signal to at least said predefined threshold; and
    detecting said pilot signal using a coherent combining technique and a noncoherent detection technique while said frequency offset remains below said predefined threshold.

2. The method according to claim 1, wherein said noncoherent detection technique further comprises the step of determining whether a signal path to said pilot signal is present based on the value of $D_1$, where $$D_1 = \left| \sum_{n=1}^{L} (x_n + jy_n) \right|^2 \quad \text{Eq. (4)}$$

where $x_n$ and $y_n$ are the real and imaginary part of a correlator output and L is an accumulation length of said correlator outputs.

3. The method according to claim 1, further comprising the step of determining the number of time periods for which said receiver will be substantially frequency locked based on said frequency offset.

4. The method according to claim 1, wherein said receiver is a CDMA receiver.

5. The method according to claim 1, wherein said coherent combining technique and said noncoherent detection technique is for M groups of L correlator outputs; and
    said M groups are noncoherently combined in order to detect said pilot signal.

6. The method according to claim 5, wherein said steps of detecting said pilot signal and noncoherently combining said M groups are performed by the following computation:

$$D_2 = \sum_{k=1}^{M} \left| \sum_{n=(k-1)L_1+1}^{kL_1} (x_n + jy_n) \right|^2 \quad \text{Eq. (5)}$$

where $x_n$ and $y_n$ are the real and imaginary part of a correlator output, L is an accumulation length of said correlator outputs and M is a number of groups of said correlator outputs.

7. The method according to claim 5, wherein said method is performed when the accumulation length is too large for coherent combining over L correlator outputs.

8. The method according to claim 5, wherein said receiver is a CDMA receiver.

9. A wireless receiver comprising:
    a noncoherent combiner and a noncoherent detector for locking the frequency of said receiver to an incoming data signal when a frequency offset does not satisfy a predefined threshold; and
    a coherent combiner and a noncoherent detector for detecting said pilot signal when said frequency offset satisfies the predefined threshold.

10. The wireless receiver according to claim 9, wherein said noncoherent detection technique determines whether a signal path to said pilot signal is present based on the value of $D_1$, where $$D_1 = \left| \sum_{n=1}^{L} (x_n + jy_n) \right|^2 \quad \text{Eq. (4)}$$

where $x_n$ and $y_n$ are the real and imaginary part of a correlator output and L is an accumulation length of said correlator outputs.

11. The wireless receiver according to claim 9, further comprising a processor for determining the number of time periods for which said receiver will be substantially frequency locked based on a frequency offset between said receiver and an incoming data signal.

12. The wireless receiver according to claim 9, wherein said receiver is a CDMA receiver.

* * * * *